United States Patent [19]

Moore et al.

[11] 3,888,248

[45] June 10, 1975

[54] ABDOMINAL PAD OR SURGICAL DRESSING

[75] Inventors: Francis C. Moore; Leon R. Perkinson, both of Indianapolis, Ind.

[73] Assignee: Moore-Perk Corporation, Indianapolis, Ind.

[22] Filed: July 23, 1973

[21] Appl. No.: 381,734

[52] U.S. Cl. .............................. 128/156; 128/296
[51] Int. Cl. .............................................. A61f 13/00
[58] Field of Search ............. 128/156, 287, 290, 296

[56] References Cited
UNITED STATES PATENTS

| | | | |
|---|---|---|---|
| 2,923,298 | 2/1960 | Dockstader et al. | 128/296 |
| 3,221,738 | 12/1965 | Ekberg et al. | 128/287 |
| 3,344,789 | 10/1967 | Arnold et al. | 128/287 |
| 3,528,417 | 9/1970 | Gardner et al. | 128/156 |
| 3,678,933 | 7/1972 | Moore et al. | 128/156 |
| 3,703,897 | 11/1972 | Mack et al. | 128/156 |

*Primary Examiner*—Aldrich F. Medbery
*Attorney, Agent, or Firm*—Dawson, Tilton, Fallon & Lungmus

[57] ABSTRACT

A pad for post-surgical use in dressing the incision to collect fluids exuded from it includes a relatively thick central core layer of soft, highly absorbent material. The application side or covering of the pad includes superposed layers of tear-resistant scrim or grid material and a layer of polyethylene. The outer side or covering includes a moisture barrier layer. The application and outer coverings are preferably bonded together along at least two peripheral edges.

9 Claims, 5 Drawing Figures

ABDOMINAL PAD OR SURGICAL DRESSING

BACKGROUND AND SUMMARY

The present invention relates to a pad or applicator for placing on wounds, incisions or burns where a large amount of fluid exudes from the wound or infection. One of the most common uses for such a pad is a post-surgical dressing following abdominal surgery. Such pads therefore become generally known as abdominal pads even though they may be applied to any part of the trunk or limbs of the body. Such pads may be taped to cover the wound or incision or they may simply rest on it with the patient in a reclining position.

Abdominal pads may be used quite frequently, particularly in a fresh wound or immediately following surgery or as in the case of a burn, when a large amount of fluid exudes from the wound or burn. In such cases, it is important that the pad have a high capacity for absorbing fluid.

The present invention has a central core of highly absorbent material, such as creped paper wadding, cotton swabbing, urethane foam, needle-punched rayon, or a combination of needle-punched rayon and cotton.

One side of the absorbent core material, called the "application side" includes superposed layers of a tear-resistant grid or scrim material and polyethylene film. The thickness of the polyethylene layer contacting the grid material is such that under application of heat and pressure, it bonds the grid material to the absorbent core material, and it partially separates from itself, as defined by the boundaries of the grid material to cling to and surround the filaments of the grid and collect any loose thread or particles that may be present in the core material. The application covering extends slightly beyond the width of the central absorbent core on either two or four sides.

When thus formed, the application covering provides a smooth surface which will not stick to the wound, burn or incision, yet it is not so slippery so that it will slide from the wound or burn. At the same time, the application covering permits rapid absorption of any fluid exuding from the wound or burn, yet prevent seepage back into the wound as the core material begins to saturate.

On the side of the absorbent core material opposite the application covering, there is an outer covering by a moisture-resistant barrier which retains any moisture held by the absorbent core material to prevent wetting the clothes or bed covering of the patient wearing the abdominal pad. The application covering and the moisture barrier are bonded together along two or four sides of the pad to retain the central absorbent core material within the pad. Preferably, the application covering is bonded by the poly-film to the absorbent core material, but the moisture barrier need not be bonded to the absorbent core material.

An important characteristic of the present pad is the fast rate of absorption of fluid. This is a highly desirable property since the article, as mentioned, has a primary intended application in those areas where large amounts of fluid are passed from a wound or incision over a relatively short time.

Further, the article has the characteristic that it will not permit absorbed fluids to bleed or pass back into the wound to any substantial degree, nor will it permit the fluids to pass through the outer covering moisture barrier. We have observed, for example, that if an article constructed according to our invention has absorbed liquid and is then placed on a dry surface with the application side down, it will leave only a very small amount of surface moisture and will not yield any significant amount of fluid under normal conditions. The grid material adds great tear resistance and mechanical strength to the article, and a grid material is preferably included in the outer covering as well as the application covering, as will be disclosed. The grid materials prevent tearing or rupture of the fluid-laden pad.

The abdominal pad of the present invention may be made of low-cost materials to reduce the overall manufacturing cost, and it is easily sterilized during manufacture according to well-known techniques; and it may be stored in a sterilized condition until ready for use.

Other features and advantages of the present invention will be apparent to persons skilled in the art from the following detailed description of a preferred embodiment accompanied by the attached drawing.

THE DRAWING

DETAILED DESCRIPTION

Figure 1:
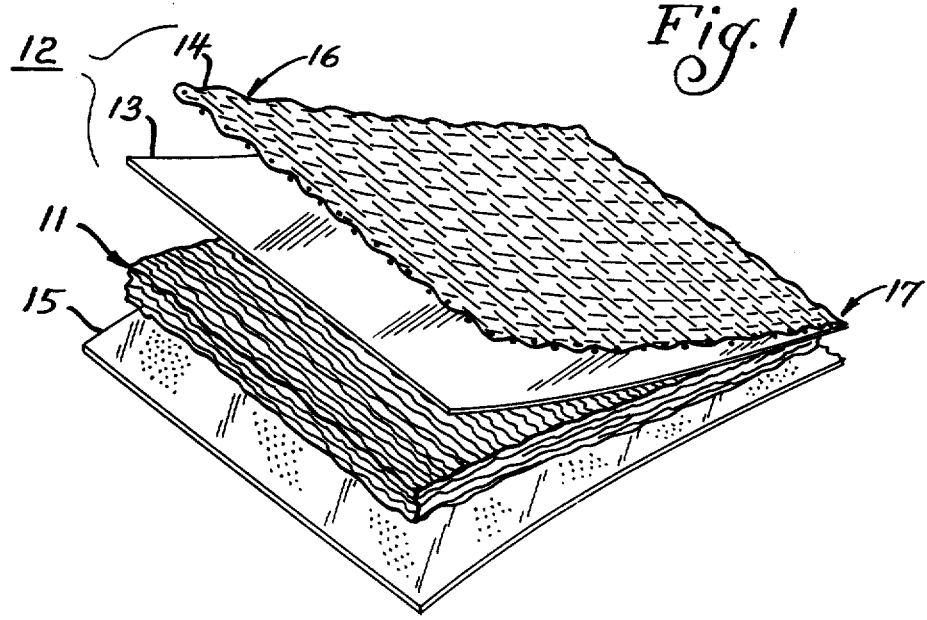
FIG. 1 is a perspective view of the various layers and components, in superposed, separated relation, which make up the present invention.

Turning first to FIG. 1, reference numeral 10 generally designates the component layers of an abdominal pad constructed according to the present invention. At the center of the pad, there is a central absorbent core layer 11. On one side of the central core layer 11 is a covering designated 12 which is intended to be applied to the wound or incision, and is hence called the "application" side or covering. It is made from a sheet of polyethylene film 13 and a layer of grid material 14.

On the other side of the core material 11 is a moisture barrier 15, which prevents the transmission or flow of fluids from the absorbent core material 11 outside of the pad, once they have passed through the application covering. Preferably, the moisture barrier 15 is impervious to liquids but not air so as to permit "breathing."

The central absorbent core 11 may be formed from a plurality of sheets of highly absorbent, porous, fibrous, soft paper of the quality used in facial tissue. Such paper may be creped up to 50 per cent according to conventional techniques. Other suitable, highly absorbent soft flexible materials that have been found satisfactory for use as an absorbent core material include fibrous rayon of the type that is used in place of cotton for swabbing, or a highly absorbent open-cell urethane foam. A non-woven material found particularly satisfactory is bleached, crimped, needle-punched rayon, such as is identified as BFL-35A and manufactured by the Barwove Company, Inc., of Little Falls, New Jersey. Alternatively, this needle-punched product would be made of 50 per cent bleached rayon and 50 per cent bleached cotton. In any case, it is a highly liquid-absorbent soft flexible material. Preferably, the thickness of the core layer may be of the order of ¼ – ⅜ in.

Figure 4:
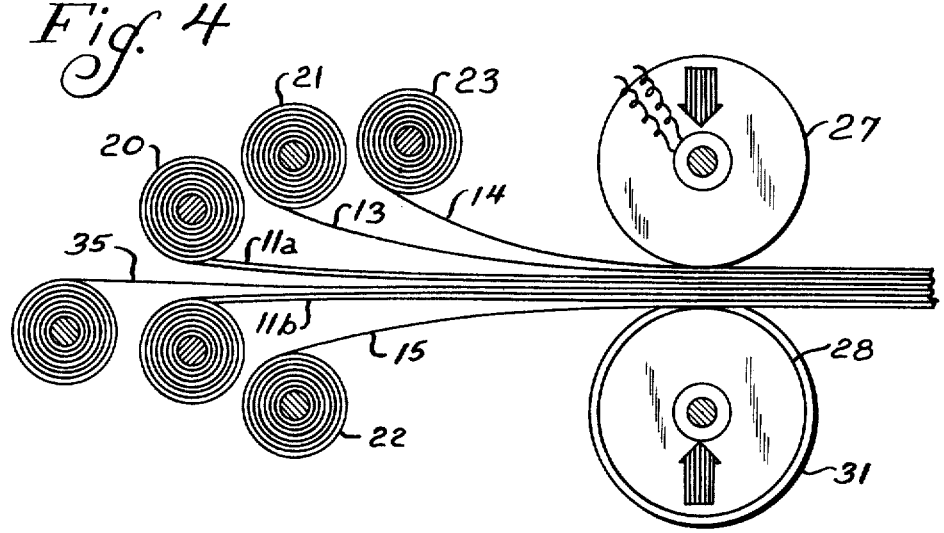
FIG. 4 is a diagrammatic side view of a method of making an alternative embodiment of the invention.

Referring now to FIG. 4, if it is desired, the absorbent core material may be made of two layers of needle-punched rayon 11a, 11b or similar material as disclosed above with a central thin layer of tissue paper 35 for "wicking" fluid laterally between the two layers of absorbent core material to spread it out for greater absorption capacity of the pad before saturating it.

The film of polyethylene 13 has a thickness preferably of about 0.2 mils, although it may be somewhat thicker. Further, other thermoplastic materials may equally well be employed, as will be understood. However, best results have been obtained using a polyethylene film having a thickness of 0.2 mils. This film is especially effective as the intermediate plastic layer since a primary function it performs is to bond the outer grid material 14 together about the periphery so as to form the pad into an integral unit. It will be observed, in the illustrated embodiment that the lateral width of the absorbent core material 11 is somewhat less than the corresponding width of the remaining component layers, thereby leaving continuous side borders as at 16, 17 for bonding together the application covering 12 comprising layers 13 and 14, an the outer or moisture barrier or covering 15.

It has been found preferable to use a perforated polyethylene film sold under the trademark, Delnet, by the Hercules Company of Wilmington, Delaware for the moisture barrier 15. This type of film may be obtained with very tiny apertures so as to be porous and permit the passage of gas or air. Such material, although thinner, and with larger apertures, is also suitable for the bonding film 13 since it is easily separated from itself to form still larger openings, under the application of heat and pressure, as will be discussed. When used as a moisture-barrier layer 15, the thickness of the perforated polyethylene is of the order of 1 – 2 mils so that it does not separate from itself under the application of heat and pressure; rather, it remains intact and prevents the transmission of liquids or fluid, yet permits the passage of air through the outer covering of the pad. Each of the thermoplastic films 13 and 15 should be under tension as heat and pressure are applied. Preferably, the orientation should be bi-directional as would occur during normal extrusion of polyethylene films.

The layer of grid material 14 may be a scrim or open network of loosely-woven, spaced fibers formed into a generally orthogonal array or grid. Preferably, spun-bonded nylon sold under the trademark, Cerex, by Monsanto Co. of St. Louis, Missouri, is used because it is highly resistant to tearing in all directions, and it is resistant to wetting when formed in single sheets.

When using spun-bonded nylon as the grid material, the thermoplastic film layer 13 may be extruded first and then calendered onto the nylon in bonding relation prior to forming the article. This achieves a better adhesion to the spun-bonded nylon, and is referred to in the art as extrusion coating.

In the case of spun-bonded nylon grid, apertures may be small enough so that if the grid is held separately, it will actually hold water in amounts of a few drops. However, we have found that when backed with the thin polyethylene sheet and absorbent core material and treated as is disclosed herein, the layer comprising the application covering passes liquid to the absorbent core at a very high rate despite the resistance to wetting of the grid; and these characteristics permit the grid to have even better resistance to passing fluid back from the absorbent core material into the wound or burn. In this respect, a spun-bonded nylon is better than a cotton scrim or other woven grid material for the use as a grid because of the larger apertures on the latter materials. It is also preferred to have a non-woven grid material because it has been found to be more resistant to sticking when applied to an open wound.

The fibers or filaments of the grid material may be natural such as cotton, hemp, flax or linen; or they may be synthetic, such as nylon or polyesters. Preferably, however, the grid is a thin, soft, porous layer composed of wet resistant fibers of natural or synthetic material in closely spaced relation so that the fibers facilitate conduction of a liquid to the core material without themselves absorbing the liquid. When the grid layer takes the form of a scrim, the filaments may be interwoven, knit, or joined together in any suitable manner; and an extra layer of polyethylene similar to the layer 13 is then placed on the outside, as will be disclosed further.

Figure 2:
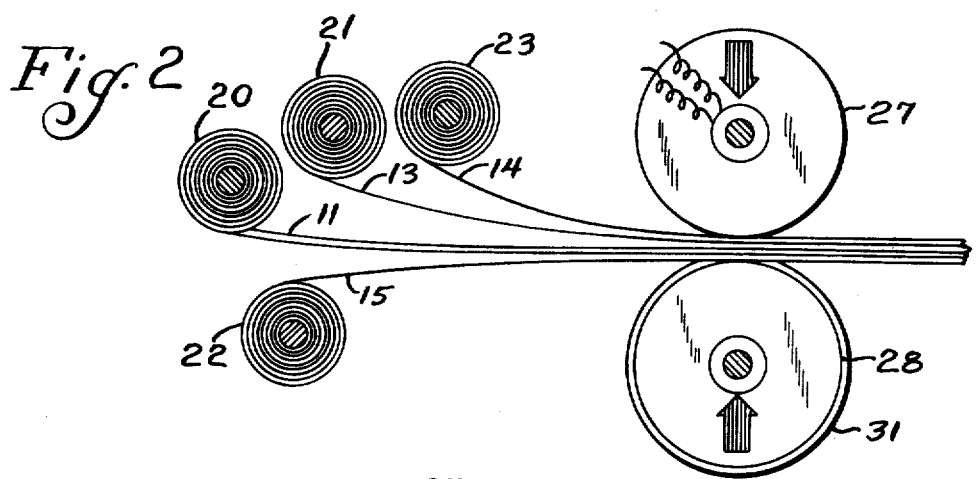
FIG. 2 is a diagrammatic side view of a continuous method of making the abdominal pad of the present invention.

Turning now to FIG. 2, the article is formed in a continuous manner as diagrammatically shown. That is, the absorbent core material 11 may be continuously drawn from a source roll 20. Similarly, the layers 13 and 15 are placed on either side of the absorbent core material 11 and drawn respectively from source rolls 21 and 22. The grid material 14 is placed above the film 13 and drawn from a source roll 23.

Figure 3:
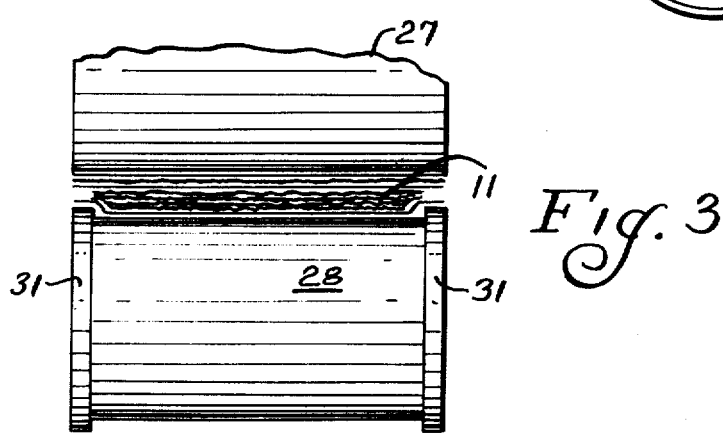
FIG. 3 is a transverse cross sectional view of an abdominal pad during construction, taken through the sight line 3—3 of FIG. 2.

The superposed layers are then passed between opposing rotating pressure rolls 27, 28, the upper one being heated according to conventional techniques, for example, electrically or by steam. Heat and pressure are hence applied to the top of the superposed layers 11–15. The temperature at the surface of roll 27 is sufficient to melt the thin layer 13, causing it to bond the grid material 14 to the absorbent core material 11; the lower roll 28 may have side flanges 31, best seen in FIG. 3, so as to provide a central recess to accommodate the extra thickness of the central core material 11. A reciprocating cutting knife (not shown) is used to form the individual pads by transversely cutting the web emanating from the rolls.

The flanges 31 join the peripheral edges 16, 17 of the pad together—that is, the side edges of the thermoplastic films 12, 15 are joined together; while at the same time, the side edges of the scrim layer 14 is joined to them to form the pad into a unitary body. If the central core material 11 is needle-punched rayon, as disclosed, then the transverse edges need not be sealed. However, the pads can be made into discrete units with all four edges bonded together, if desired.

The roll 27 is heated to a point sufficient to raise the temperature of the polyethylene film 13 to a melting point, and the speed of the web and temperature of the roll must be such that the moisture-barrier layer 15 is not melted, except for the edges, as already disclosed. This is not difficult because the absorbent core material 11 is a good heat insulator. The surface temperature of the roll 27 is normally between 200° and 400° F., the precise temperature depending upon the thickness of the plastic layer, the exterior grid material employed, the speed at which the web travels, etc. However, as mentioned, the temperature should not be such as to melt the thicker exterior plastic layer 15 because this must be kept intact in order to retain its moisture-resistant barrier property. If the thickness of the layer 15 is 1-2 mils, the thickness of the layer 13 will preferably be about 0.2 mils, although it may be as thick as 0.8 mils.

The grid material and the core layer must also be dimensionally stable at these temperatures. With the application of pressure and temperature, the exterior grid layer 14 provides a large number of closed boundaries beyond which the melting, separating plastic film 13 will not withdraw from itself as it melts and deforms. That is to say, the apertures in the grid material act as boundaries to limit the separation of the plastic film material as heat and pressure are applied to melt it; and as the layer 13 melts, it not only bonds the grid material 14 to the absorbent core material 11, but it also separates from itself to form a more porous material and clings to the filaments of the grid material.

The melting plastic film thus forms apertures within a large number of the closed boundaries of the grid and gathers itself together in wrapping, covering engagement about adjoining filaments of the grid—thus at least partially encompassing the scrim material in a plastic coating while advantageously collecting or gathering together any loose films or threads from the scrim as well as any lint on the outer surface of the absorbent core material 11. At the same time, the thermoplastic films act as a bonding agent, holding together the layers on either side of it.

In the case of a cotton scrim used as the grid layer 14, an outer plastic film is used to provide a non-sticking yet non-sliding surface. Such a surface is provided in the case of a spun-bonded nylon grid material through a combination of the nylon and the inner polyethylene film 13, as shown. That is, when spun-bonded nylon is used as the grid material 14, the outer plastic layer just mentioned is not necessary because a non-sticking, non-sliding surface can be obtained without it.

It will be appreciated that the separating plastic sheet material of the film 13 provides a communication to the absorbent core material 11 to promote the overall absorption properties of the applicator. This transmission is further facilitated when a perforated thermoplastic film, such as the one disclosed, is used, rather than a continuous film. It has been found that not all of the areas of plastic enclosed by the individual grids need be separated or opened in order to achieve a very rapid absorption characteristic for the pad. Rather, substantial numbers of contiguous elemental areas within the grid material may remain impermeable to fluid without appreciably diminishing the absorption rate for the overall retention capacity of the applicator. In other words, during manufacture, the application of heat should be such as to result in a rupture or separating of the thermoplastic film 13 within the boundaries defined by the grid material 14 for a major portion of such zones in order to effect a greater transmission of fluid to the absorbent core material; however, it is not essential that the plastic material separate at each closed boundary defined by the grid material.

The thermoplastic film 14 will further act to bond the grid material 14, 15 to the outer surface of the central core material 11; however, such bonding, although desirable, is not absolutely necessary for the practice of the invention. Further, adhesive bonding could be used. The bonding does provide additional rigidity and body to the pad, and facilitates handling.

Alternatively, the application covering may be pre-laminated by extruding the polyethylene, then bringing it into contact with the spun-bonded nylon and then calendering the two together—a process referred to in the art as extrusion coating. The pre-laminate, core and moisture barrier layer are then brought into superposed relation as already dislcosed; and only the peripheral edges need be heat sealed then.

Figure 5:
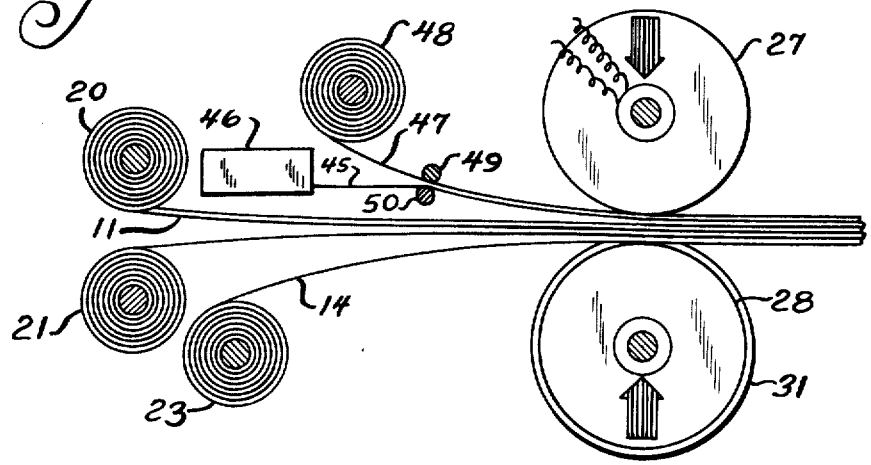
FIG. 5 is a diagrammatic side view of a method for making still another embodiment of the invention.

In an alternative embodiment of the invention as shown in FIG. 5, the absorbent core material 11 can be as disclosed, and the application covering 12 may also be as has already been disclosed. However, the perforated polyethylene sheet 15 may be replaced by a poly-coated spun-bonded nylon layer 45 of the type disclosed above in connection with the extruded-coated spun-bonded nylon. That is to say, a thin layer of polyethylene, of the order of 0.1 - 0.2 mils is extruded at 46, then brought into contact with a co-extensive layer of spun-bonded nylon 47 from a source 48; and the two are forced between nip or calender rolls 49, 50 to bond them together as the polyfilm is extruded. As indicated above, such a layer prevents any substantial seepage of liquids once absorbed by the absorbent core material 11 back through the layer; and it would be sufficient to prevent seepage onto clothing, bed clothing or the like, yet permit the outer covering to "breathe."

An abdominal pad thus formed has been found to provide a very rapid absorption characteristic together with a high capacity for absorbing and holding liquid with which it comes into contact at its applicator covering. The finished product has a soft feel to it, provides greater padding than cotton, has greater absorption capabilities than gauze, and is highly resistant to passing absorbed fluids back into a wound. Further, it can be used under bed clothing or street clothing without fear of passing the effused material through the moisture-resistant barrier covering.

In addition, the application covering comprising the thermoplastic layer 13 and the scrim or grid layer 14 (and additional outer thermoplastic layer, if required or desired) provide a surface which will not stick to the wound even though it may be in continuous contact with it over an extended period of time, nor will it slide from the wound if it is placed on it without additional attachment, such as with a tape. As has already been mentioned, the rate of absorption is quite high.

The pad is economical to make, is easily sterilized and packaged, and adapts itself to a wide variety of applications.

Having thus described preferred embodiments of our invention, persons skilled in the art will be able to modify the structure of the abdominal pad that has been illustrated and to substitute equivalent materials for those which have been disclosed while continuing to practice the principle of the invention; and it is, therefore, intended that all such modifications and substitutions be covered as they are embraced within the spirit and scope of the appended claims.

I claim:

1. An abdominal pad or surgical dressing comprising: a central core layer of highly absorbent material having a thickness in the range of about one-fourth in. to three-eighths in.; an application covering over one side of said core material and comprising a first layer of thermoplastic material adjacent said core material and an outer covering of grid material bonded together under heat and pressure to form a non-sticking, non-sliding outer surface and permitting the passage of fluid while minimizing bleed back; and a moisture resistant barrier layer on the other side of said core material, said core layer, application covering and barrier layer being attached to form a unitary pad which will not separate.

2. The article of claim 1 wherein said moisture resistant barrier layer includes a second layer of thermoplastic film adjacent said core material and a layer of spun-bonded nylon on the outside of said second film material, the width of said core material being less than that of the other layers, all of said layers being formed together under the application of heat and pressure to bind at least two opposite peripheral edges together, said first thermoplastic film at least partially separating from itself as held by said first grid material to permit the transmission of fluids through said first grid material to be absorbed by said core material and to cover said grid material in partial wrapping engagement to provide said non-sticking, non-sliding exterior application surface.

3. The article of claim 1 wherein said first thermoplastic film layers comprise a thin polyethylene film having a thickness in the range 0.2 mils – 0.8 mils.

4. The article of claim 1 wherein said moisture resistant barrier is a perforated polyethylene film having a thickness of at least about 1 mil and is bonded to said application covering at least at opposite margins of said pad.

5. The article of claim 1 wherein said central core material comprises needle-punched bleached rayon.

6. The article of claim 1 wherein said grid material comprises spun-bonded nylon.

7. An abdominal pad or a surgical dressing comprising: a central core material having a thickness of at least one-fourth inch; an exterior application covering on one side of said core material and comprising a first layer of thin thermoplastic sheet material and a first layer of tear-resistant grid material, arranged in the stated order proceeding outwardly from said core material, the layers comprising said application covering having a width greater slightly than the width of said core material to provide marginal edges extending beyond said core material; and a moisture resistant covering on the side of said core material opposite said application covering and comprising a perforated film of thermoplastic material bonded to said marginal edges of said application covering by said first and third thermoplastic film materials, said application covering being secured to said core material.

8. An abdominal pad or covering comprising a layer of highly absorbent core material having a thickness in the range one-fourth in. to three-eighths in.; an application covering comprising a thin layer of thermoplastic material having a thickness of about 0.2 inch and a layer of spun-bonded nylon exterior of said layer of thermoplastic sheet material, said application covering a width greater than the corresponding width of said core material; and a moisture-resistant barrier on the side of said central core material opposite said application covering and comprising a second layer of air-pervious, liquid impervious material adjacent the core material; said moisture-resistant covering also having a width greater than the corresponding width of said core material and being secured to said application covering under the application of heat and pressure about opposite peripheral edges about said core material, said spun-bonded nylon being bonded to said core material substantially throughout their opposing surfaces by said layer of thermoplastic material, and said moisture barrier being attached to said application covering.

9. The article of claim 7 wherein said core material comprises superposed layers of absorbent material separated by a central layer of wicking material to transmit fluid passing to the first layer of core material throughout the body of said core material.

* * * * *